Sept. 26, 1961 M. BELIVEAU ET AL 3,002,132

CRYSTAL DIODE ENCAPSULATION

Filed Dec. 24, 1956

INVENTORS
MAURICE BELIVEAU
FRANK E. GRACE

BY

Alvin J. Riddles

AGENT 3,002,132

CRYSTAL DIODE ENCAPSULATION

Maurice Beliveau and Frank E. Grace, Poughkeepsie, N.Y., assignors to International Business Machines Corporation, New York, N.Y., a corporation of New York Filed Dec. 24, 1956, Ser. No. 630,414
1 Claim. (Cl. 317—234)

This invention relates to the packaging of semiconductor devices and in particular to the glass encapsulation of crystal diodes.

It has been established in the art that hermetic seals are an essential feature of any encapsulating technique wherein long life and reliability is desired in a semiconductor device. In the forming of semiconductor diodes, involving glass as a container which may be hermetically sealed, major difficulties arise as a result of the intense heat required to fuse the glass and form the seal. Two general techniques have been used in the art to provide glass encapsulated diodes. The first of these involves the assembly of parts to form the rectifying contact before the glass container is sealed and the second of these involves the assembly of parts to form the rectifying contact as the container is sealed. In each of the prior art practices, no provision is made in the assembly process for performing operations such as cleaning and testing on the rectifying contact after assembly and before sealing in a container.

There are many advantages to be gained by being able to perform work on the rectifying contact after assembly and before encapsulation. An illustrative one of such advantages is that such a structure is capable of having the rectifying contact chemically or electrolytically etched after formation. Such etching improves back resistance, stabilizes characteristics and provides other advantages well known in the art. Another illustrative advantage is the fact that the rectifying contact assembly may be coated with chemicals to improve performance.

This invention provides a technique of all glass encapsulation of semiconductor diodes wherein two substantially rigid electrodes are maintained in fixed position, the semiconductor diode parts are mounted and assembled on these electrodes and the rectifying contact is formed completely, prior to encapsulation. A treatment step is then available, applicable to the assembled parts prior to encapsulation and finally a glass envelope is fused in one operation completely surrounding the device and sealed to the substantially rigid electrodes.

A primary object of this invention is to provide a technique of glass encapsulating diodes wherein the diode may be treated after assembly and before sealing.

Another object of this invention is to provide an improved glass encapsulated diode.

Still another object of the invention is to provide a glass encapsulated diode having a minimu number of parts.

Still another object of this invention is to provide an improved technique of glass encapsulating diodes involving a minimum number of steps.

A related object is to provide a semiconductor diode structure wherein a minimum amount of heat reaches the semiconductor structure as a result of the sealing of the glass encapsulating envelope.

Other objects of the invention will be pointed out in the following description and claim and illustrated in the accompanying drawings, which disclose, by way of example, the principle of the invention and the best mode which has been contemplated of applying that principle.

Figure 1:
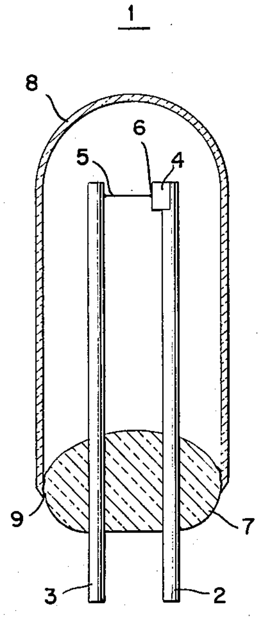
FIGURE 1 is a sketch of one embodiment of a semiconductor diode illustrating the structural principle of this invention.

Refer now to FIGURE 1, one embodiment of a glass encapsulated semiconductor diode is shown having a pair of substantially rigid electrodes 2 and 3 respectively, extending from the lower portion thereof. Attached to electrode 2 is a semiconductor crystal 4 of germanium or silicon or other suitable semiconductor material. Attached to electrode 3 is a rectifying electrode element 5 such as a tungsten wire, a gold wire containing appropriate conductivity directing impurities or a platinum-ruthenium wire which forms a rectifying contact with the semiconductor crystal 4 at a point 6. This contact 6 may be a point contact or a junction such as is formed by the techniques of gold bonding, both of which types of contacts are well known in the art. For purposes of illustration, the gold bonded junction type of rectifying contact has been selected. Electrodes 2 and 3 are rigidly maintained in position with respect to each other by a retaining element shown as a glass bead 7 which is fused around these electrodes. A glass envelope 8 covers the entire assembly and is fused to the glass bead 7 forming a seal 9.

It will be apparent that the encapsulated diode structure of this invention is made up of an absolute minimum of parts. The structure, in addition to simplicity in number of parts and steps in fabrication, has a major advantage in that the structure permits interim treatment operations such as cleaning and testing. As a result of the rigid mounting of the electrodes 2 and 3 in the bead 7, the fabrication of the diode subassembly, namely, the mounting of the germanium crystal 4, the rectifying electrode 5 and the formation of the rectifying contact 6 are facilitated. The operations associated with the subassembly involving parts 4, 5 and 6 are all performed prior to the application and sealing of the glass housing 8. Hence, upon completion of the assembly of items 4, 5 and 6, treatment such as etching and rinsing may be freely performed upon this subassembly, thereby minimizing the presence of contaminants in the vicinity of the rectifying contact 6. Since the diode is complete electrically at this stage, the output characteristic may be examined, or any other testing procedure utilized. This is of considerable advantage since further etching or electroforming operations may be instituted as a result of such test and manufacture of a particular device, if found to be bad, may be discontinued thereby resulting in a saving of time and materials, further this provides an opportunity to analyze the manufacturing process to determine if factors causing devices to be bad occur before or after sealing. The diode subassembly may also be coated during this treatment step to provide advantages to be later described. Upon completion of all operations associated with the diode subassembly, the glass cover 8 is then slipped down over the entire assembly and is fused so as to form a seal with electrodes 2 and 3. This is illustrated as seal 9 made to the bead 7 which has been previously sealed to electrodes 2 and 3 although if the electrodes 2 and 3 are maintained in rigid relationship by an external fixture not shown the seal 9 of the cover 8 may be made directly to the electrodes thereby eliminating the bead 7. It will be apparent that this seal is made at only one point, which point is remote from the semiconductor crystal 4. Further features of this assembly will be pointed out in connection with the preferred method of assembly of this device which will be later described.

Figure 2:
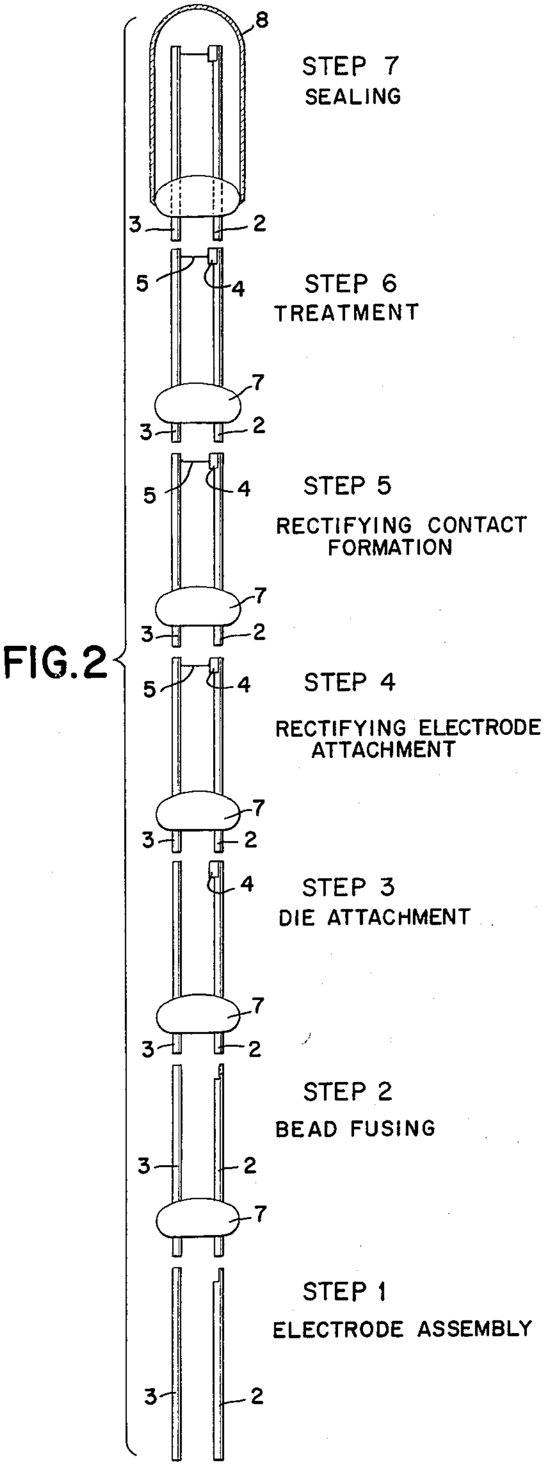
FIGURE 2 is an illustration of the assembly technique of the diode of FIGURE 1.

Referring now to FIGURE 2, a preferred method of assembling this invention is shown, wherein in step 1, two substantially rigid electrodes 2 and 3, respectively, of a material which facilitates forming a seal with glass, for example—the alloys known in the art as "Kovar" or "Dumet"—are placed in side-by-side relationship. Electrodes 2 and 3 need only be rigid enough to retain the rectifier subassembly previously discussed in fixed relationship during the encapsulating operation and to withstand shocks to which such devices would normally be subjected. It will be apparent at this point, that, were it desirable to design a device to withstand heavy shock, the size of electrodes 2 and 3, and the distance, referring to FIGURE 1, between the bead 7 and the rectifier subassembly, namely, elements 4, 5 and 6, could be adjusted to provide the desired shock resistance.

In step 2, a proper melting point glass bead 7 is fused around electrodes 2 and 3 retaining two electrodes in substantially parallel relationship to each other and providing an hermetic seal around each. It will be apparent that a plurality of beads 7 may be fused around electrodes 2 and 3 in order to facilitate construction and handling and to provide rigidity of the electrodes 2 and 3, if desired. Similarly it will also be apparent that a fixture may be used to retain electrodes 2 and 3 in rigid relationship so that the use of the glass bead 7 may be avoided.

In step 3 of the process, the semiconductor die is attached to one of the two electrodes shown in this illustration as electrode 2. This die may be soldered or ohmically gold bonded to the electrode by any technique well known in the art in order to impart a low forward resistance to the ultimate device. For example, it has been found that the use of solder containing antimony provides a satisfactory bonding agent for an N conductivity type semiconductor die. In FIGURE 2 the electrode 2 is shown with a recess to facilitate the positioning of the semiconductor die 4. However, this feature is optional so long as the die 4 is ohmically bonded to the electrode 2 at a desired position.

In step 4 of the process a rectifying electrode 5 is attached to electrode 3, for example, as by welding in a position so that the electrode 5 may make contact with the die 4.

In step 5 of the process, the rectifying electrode is caused to form a rectifying contact 6 with the die 4. For one example, this may be done by initially making the rectifying electrode 5 sufficiently long and of proper shape to provide the necessary pressure for point contact rectification on the die. Or, as a preferred alternative, the rectifying electrode 5 may be made of gold containing suitable conductivity directing impurities in order to provide a rectifying contact and a current passed between the electrode 5 of the die 4 as by applying a potential between the electrodes 2 and 3 to provide a "gold bonded" junction connection at rectifying contact 6, as is well known in the art.

In step 6, since all of the elements essential to provide the performance of the diode are completely assembled, it is possible to perform any treatment operation to the subassembly such as a cleaning, testing or coating step or a combination thereof which may be advantageous to the production of a reliable device. For example, in the case of the above-described "gold bonded" junction, it is now possible to remove from the surface of the die 4 in the vicinity of the contact 6 any undesirable contaminants which may have become deposited there as a result of handling or bonding. Such contaminants have been found to be detrimental to the performance, reliability and long life of the device.

An example of a cleaning operation to insure removal of such contaminants is an electrolytic etching operation wherein electrode 2 and, consequently, the semiconductor die 4 is made, the anode in an electrolytic bath containing approximately a 5% solution of sodium hydroxide for approximately eight seconds, followed by rinsings in baths of distilled water, of methyl alcohol and of trichloro ethylene of fifteen seconds each. It will be apparent that at this stage of assembly as a result of the type of construction of this device and of the process of so constructing, it is possible to perform any cleaning, testing or coating operation or combination of operations desired, to the device. The coating of the diode subassembly has been found to be particularly advantageous in that through the use of a suitable coating material, the adverse effects of contamination may be minimized and heat insulation during a sealing step to be later described is gained. An example of a suitable coating material is trifluoromonochloroethylene known in the art as "Kel-F." It will be obvious to one skilled in the art that a desiccant may be mixed in a coating material if employed.

Step 7 of the process is the final encapsulation operation wherein a glass sleeve, shown in this illustration as having one end closed, is applied over the subassembly of elements 4, 5 and 6 and forming a seal with electrodes 2 and 3, the seal 9 is shown in this illustration as made to the bead 7 which in turn is sealed to the leads 2 and 3.

The seal 9, for example, may be made by subjecting the area of contact of the sleeve 8 with the bead 7 to sufficient heat, thereby fusing the glass. This sealing operation may be conducted in a controlled environment such as a vacuum or an inert gas if desired, and further, a chemical such as a desiccant, may be encapsulated with the diode at this stage of the operation by merely inserting it, in the glass container 8 prior to sealing.

What has been described is a glass encapsulated semiconductor diode structural principle and process wherein an absolute minimum of parts are employed and assembled in a minimum number of steps, and wherein in the initial operation, the mounting electrodes which will serve as supports for the actual diode subassembly are mounted in rigid relationship; then upon the forming of an electrically complete subassembly of the semiconductor diode, the subassembly may be subjected as a result of this construction to various treatment steps, such as cleaning, testing or coating that may be advantageous to the production of superior semiconductor devices and finally, a glass encapsulating cover is placed over the electrode and diode subassembly combination and is fused to the support electrodes at a point remote from the diode subassembly so as to minimize heat transfer to the germanium die and the rectifying contact.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the following claim.

What is claimed is:

A glass encapsulated semiconductor diode comprising in combination a first rigid Kovar electrode; a germanium semiconductor crystal ohmically bonded to said first rigid Kovar electrode; a second rigid Kovar electrode; a gold rectifying electrode ohmically bonded to said second rigid Kovar electrode; a Pyrex glass bead fused to and forming an hermetic seal with said first and second rigid electrodes; a gold bonded rectifying contact formed between said rectifying electrode and said germanium crystal, and a Pyrex glass housing surrounding said rectifying electrode and said germanium crystal and fused to said Pyrex glass bead.

(References on following page)

References Cited in the file of this patent

UNITED STATES PATENTS

| | | |
|---|---|---|
| 2,586,609 | Burke | Feb. 19, 1952 |
| 2,646,536 | Benzer et al. | July 21, 1953 |
| 2,694,168 | North et al. | Nov. 9, 1954 |
| 2,699,594 | Bowne | Jan. 18, 1955 |
| 2,736,847 | Barnes | Feb. 28, 1956 |
| 2,749,488 | Mayer | June 5, 1956 |
| 2,762,956 | Ingraham | Sept. 11, 1956 |
| 2,784,478 | Slade | Mar. 12, 1957 |
| 2,792,538 | Pfann | May 14, 1957 |
| 2,793,331 | Lamb | May 21, 1957 |
| 2,799,814 | Schwartz | July 16, 1957 |
| 2,827,598 | Levy et al. | Mar. 18, 1958 |
| 2,844,772 | Weil | July 22, 1958 |

FOREIGN PATENTS

| | | |
|---|---|---|
| 753,488 | Great Britain | July 25, 1956 |